United States Patent Office 3,524,898
Patented Aug. 18, 1970

3,524,898
HOMOGENEOUS DEHYDROGENATION OF PARAFFINS
Patrick D. Beirne, Farmington, Mich., assignor to Ethyl Corporation, New York, N.Y., a corporation of Virginia
No Drawing. Filed Oct. 29, 1968, Ser. No. 771,658
Int. Cl. C07c 5/18, 15/00; B01j 11/12
U.S. Cl. 260—683.3                                10 Claims

ABSTRACT OF THE DISCLOSURE

Dehydrogenate $C_{6-20}$ paraffins by contacting them with a carbonyl halide Group VIII transition metal complex such as $IrCl(CO)(PR_3)_2$ as a catalyst, at temperatures from 300° to 425° C., and optionally in the presence of a hydrogen acceptor.

BACKGROUND OF THE INVENTION

The dehydrogenation of hydrocarbons per se is well known and many processes and catalysts have been employed in the prior art to accomplish the dehydrogenation. Most of the known processes and catalysts, however, are concerned with dehydrogenation of paraffins having less than six carbon atoms, dehydrogenation of olefins to polyunsaturated olefins, or the dehydrogenation of paraffins having 6 or more carbon atoms to yield aromatic products. Very little is available in the prior art dealing with the dehydrogenation of paraffins having more than six carbon atoms to obtain corresponding olefins. Most of the known catalysts, such as, for example, the well-known chromia-alumina dehydrogenation catalysts are not very effective for dehydrogenating higher paraffins to olefins because, in addition to causing some dehydrogenation, they also cause considerable aromatization and cracking. Separation of such undesirable products from olefins is very tedious and expensive. Furthermore, few relatively efficient methods of separation are available and these are generally outside the scope of commercial use. In addition, alicyclic hydrocarbons have been dehydrogenated with platinum catalysts at about 500° C.

It is, therefore, readily apparent that a new process for the dehydrogenation of paraffins to olefins which will accomplish the dehydrogenation without also causing aromatization or cracking is a valuable advance in the art.

It is an object of this invention to provide a new process for the dehydrogenation of a paraffin having from 6 to about 20 carbon atoms to the corresponding olefin. A further object is to accomplish the dehydrogenation in a reaction employing a homogeneous catalyst. Additional objects will become apparent from the following detailed description of the invention.

SUMMARY OF THE INVENTION

The present invention relates to the dehydrogenation of saturated hydrocarbons. More particularly, the invention relates to a process for homogeneously catalyzing the dehydrogenation of higher molecular weight paraffins to the corresponding olefins.

It has now been found that the above objects can be effected by a process for dehydrogenating paraffins having from 6 to about 20 carbon atoms comprising contacting said paraffins with a catalyst compound having the general formula:

$$MX(CO)_x(YR_3)_y$$

wherein M is selected from the group consisting of iridium and osmium, X is a halogen, x and y are integers, x having a value of 1 or 2 and y having a value of 2 or 3, such that the sum of x and y is equal to 3 when M is iridium, and equal to 5 when M is osmium, Y is selected from the group consisting of phosphorus, arsenic, and antimony, and R is selected from the group consisting of hydrogen, alkyl radicals having 1 to 20 carbon atoms, aryl radicals having from 6 to 20 carbon atoms, cycloalkyl radicals having 6 to 20 carbon atoms, and aralkyl radicals having 7 to 20 carbon atoms; said process being carried out at a temperature of from 300° to about 425° C.

In many instances under the reaction conditions herein described, the catalysts of this reaction are homogeneous catalysts; that is, instead of maintaining a separate physical relationship with the reaction mixture, the catalyst dissolves to a substantial extent. Previous dehydrogenation catalysts have been of the heterogeneous type in which reliance is placed on the surface contact of the reaction mixture with the catalyst, resulting in inadequate contact of the reactants with the catalyst and poor results. The present invention contemplates a catalyst which is substantially miscible with the reaction mixture and, therefore, intimately contacts the reactants throughout the mixture.

Such homogeneous catalysts, therefore, must be relatively compatible with the hydrocarbon constituents of the reaction mixture. Further, the homogeneous catalysts of this invention must maintain their compatibility under the reaction conditions. Also, they must not interfere with the product separation and recovery.

Homogeneous catalyst compounds meeting the above requirements have been found to contain a transition metal of Group VIII complexed with a halogen, a carbonyl, and at least one ligand which is an organic compound having in its molecule an atom of an element selected from phosphorus, arsenic and antimony, said atom possessing a lone pair of electrons.

The transition metal may be either osmium or iridium, and the halogen may be any convenient halide, although usually the chloride is preferred. The carbonyl radical may be present as a plurality of carbonyl radicals attached to the complex, but usually a single carbonyl radical is preferred. The transition metal may be in any convenient oxidation state, but in some instances, it may be that the metal becomes reduced to a lower valency state during the formation of the complex, some of the ligand or solvent acting as a reducing agent.

The ligand for present use is defined as an organic compound having in the molecule an atom of an element selected from phosphorus, arsenic, or antimony, being in such a valency state that it possesses a lone pair of electrons. The preferred ligands within the definition include: tertiary phosphines, arsines and stibines. For example, there may be employed tributyl or triphenyl phosphine, triphenyl arsine or stibine, dimethyl phenyl phosphine, methyl diphenyl phosphine, ethyl diphenyl phosphine or arsine, and the like.

The complex may be represented by the general formula:

$$MX(CO)_x(YR_3)_y$$

wherein M represents the transition metal, X is a halogen, x and y are integers, x having a value of 1 or 2 and y having a value of 2 or 3, such that the sum of x and y is equal to 3 when M is iridium, and equal to 5 when M is osmium, Y is selected from phosphorus, arsenic and antimony, and R is selected from the group consistent with the hereinabove described ligand. It is preferred that the catalyst complex be electronically neutral, but it may be a positively charged ion. The preferred valency state of the transition metal in the complex depends on the particular metal employed. For osmium, it is 2, 3, or 4, and for iridium it is 1, 3 or 4. If desired, the complex may contain hydrogen chloride in addition to the halogen by itself. This is found to add stability to the complex.

Catalyst compounds such as iridium chlorocarbonylbis(tributylphosphine),
iridium chlorocarbonylbis(trimethylphosphine),
iridium chlorocarbonylbis(dimethylphenylphosphine),
iridium chlorocarbonylbis(methyldiphenylphosphine),
iridium bromocarbonylbis(triethylphosphine),
iridium chlorocarbonylbis(ethyldiphenylphosphine),
iridium chlorocarbonylbis(diethylphenylphosphine),
iridium chlorocarbonylbis(tributylarsine),
iridium iodocarbonylbis(trimethylarsine),
iridium chlorocarbonylbis(dimethylphenylarsine),
iridium chlorocarbonylbis(methyldiphenylarsine),
iridium chlorocarbonylbis(dibutylcyclohexylarsine),
iridium chlorocarbonylbis(ethyldiphenylarsine),
iridium chlorocarbonylbis(diethylphenylarsine),
iridium chlorocarbonylbis(tributylstibine),
iridium chlorocarbonylbis(trieicosylstibine),
iridium chlorocarbonylbis(dimethylphenylstibine),
iridium bromocarbonylbis(methyldiphenylstibine),
iridium chlorocarbonylbis(triethylstibine),
iridium chlorocarbonylbis(ethyldiphenylstibine),
iridium chlorocarbonylbis(diethylphenylstibine), are suitable for the process of this invention.

In addition, the osmium complexes such as osmium chlorodicarbonyltris(tritetradecylphosphine),
osmium chlorodicarbonyltris(trimethylphosphine),
osmium chlorodicarbonyltris(dimethylphenylphosphine),
osmium chlorodicarbonyltris(methyldiphenylphosphine),
osmium chlorodicarbonyltris(triethylphosphine),
osmium chlorodicarbonyltris(ethyldiphenylphosphine),
osmium chlorodicarbonyltris(diethylphenylphosphine),
osmium chlorodicarbonyltris(tributylarsine),
osmium chlorodicarbonyltris(trimethylarsine),
osmium chlorodicarbonyltris(dimethylphenylarsine),
osmium chlorodicarbonyltris(methyldiphenylarsine),
osmium chlorodicarbonyltris(tri-tertiary butyl arsine),
osmium iododicarbonyltris(ethyldiphenylarsine),
osmium chlorodicarbonyltris(diethylphenylarsine),
osmium chlorodicarbonyltris(tributylstibine),
osmium chlorodicarbonyltris(tritetradecylphenylstibine),
osmium chlorodicarbonyltris(dimethylphenylstibine),
osmium chlorodicarbonyltris(methyldiphenylstibine),
osmium chlorodicarbonyltris(triethylstibine),
osmium chlorodicarbonyltris(ethyldiphenylstibine),
osmium chlorodicarbonyltris(diethylphenylstibine)

also have been found to be suitable.

A particularly effective species of the catalyst is the carbonyl chlorobis(triphenylphosphine)iridium complex. This complex may be prepared by reacting an excess of from 3 to 10 times the stoichiometric quantity of the tertiary phosphine with an iridium chloride and an alcohol, preferably aqueous 2-(β-methoxyethoxy)ethanol. On cooling, the complex often crystallizes from the solution in a virtually quantitative yield. The crystals which are lemon yellow in color are separated and washed to remove any impurities. A more detailed account of the preparation of this catalyst compound is essentially that of L. Vaska and J. W. DiLuzio, J. Am. Chem. Soc., 83, 2784 (1961). Alternatively, the complexes may be made using the tertiary phosphines, arsines or stibines.

In practicing the present invention, the temperature should be high enough to afford reasonable reaction rates, but not so high as to decompose the catalyst, reactants, or products. In general, temperatures above about 425° C. are sufficiently high to cause the catalyst to form a decomposition product. Moreover, temperatures below about 300° C. do not give reaction rates sufficient to obtain good yields of olefin product. Therefore, the process is carried out at a temperature from 300 to about 425° C., preferably from 325° to 400° C., and most preferably, from 350° to about 385° C.

The pressure at which the present invention operates is not critical and depends on the reaction conditions involved. The pressures under which this process is operable range from about atmospheric pressure to about 1000 p.s.i.g. or higher. It is preferred to use pressures from ambient pressure to 400 p.s.i.g. In a most preferred embodiment of this invention, the pressure is from 300 to 400 p.s.i.g. It may be desired to carry out the process of this invention at superatmospheric pressures under an inert atmosphere because of the volatile nature of the reactants and in order to maintain non-hazardous working conditions. For example, inert gases under which the process may be carried out are nitrogen, carbon monoxide, argon, neon or helium.

According to the process of this invention, a paraffin having from 6 to about 20 carbon atoms may be dehydrogenated. Such paraffins include the normal paraffins of the methane series; for example, n-hexane, n-heptane, n-decane, n-dodecane, n-hexadecane, n-octadecane, and n-eicosane. The preferred paraffins are those having from 10 to 18 carbon atoms. The simpler branched paraffins such as methyl and ethyl mono-substituted $C_{5-18}$ and di-substituted $C_{4-16}$ paraffins may also be dehydrogenated by the process of this invention. For example, 2-methylbutane, 2-ethylhexane, 2,2-dimethyloctane, 4-methyldodecane, 2-ethyltetradecane, 2,2-dimethylhexadecane, are simple branched paraffins which may be dehydrogenated using this method. Further, the cycloalkanes and cycloalkenes such as cyclohexane, cyclohexene, cycloheptane, cyclodecane, and cyclododecane and their hydrocarbyl-substituted derivatives; e.g., 1-methylcyclohexane, 1-methylcyclohexene, bicyclooctane, Decalin and camphane, may also be dehydrogenated.

The concentration of the catalyst is not critical as long as an effective amount of catalyst is employed. It was determined that doubling the catalyst concentration raised the product olefin yield to less than double the previous amount. Thus, the catalyst concentration for the purpose of the present reaction is less than critical, but catalyst must be present in sufficient quantities to produce acceptable yields at satisfactory rates. The catalyst has been effective at molar concentration of from 0.0025 mole to about 0.1 mole of the iridium complexes. A more preferred catalyst concentration ranges from 0.003 to about 0.015 mole of the iridium complexes. A most preferred catalyst concentration is about 0.005 mole of the iridium complexes. The osmium catalyst complexes are similar in nature to the iridium complexes with respect to concentration.

Usually, the reaction time is from one to 24 hours.

In practicing the process of this invention, a promoter may be advantageously employed. The dehydrogenation process produces hydrogen as a result of action on the saturated hydrocarbons. In order to increase yields by preventing the resaturation of the dehydrogenated paraffins produced, a material having greater affinity for the hydrogen under the reaction conditions may be added to the reaction mixture. This material is a hydrogen acceptor and may be defined as having a greater affinity for hydrogen than the dehydrogenated paraffins. Specifically, said hydrogen acceptor is a lower alkene hydrocarbon having from 2 to 19 carbon atoms and at least one carbon atom less than the paraffin to be dehydrogenated. The relationship stated between the starting paraffin and the hydrogen acceptor exists because of the fact that a lower alkene hydrogenates more readily than does a higher alkene. Therefore, the requirement of the hydrogen acceptor having one carbon atom less than the dehydrogenated paraffin renders the hydrogen acceptor more readily hydrogen-attractive than the olefins produced. Hydrogen acceptors which may be used in the process of this invention include ethylene, propylene, butene, pentene, hexene, heptene, octene, decene, dodecene, hexadecene, or nondecene. Further, the simple hydrocarbyl-substituted alkenes within the 2 to 19 carbon atom range are also useful hydrogen acceptors. In addition, cyclic alkenes may be used in the process as hydrogen acceptors; e.g., cyclopentene, cyclohexene, norbornene. The most preferred hydrogen acceptors are ethylene, decene-1, or norbornene. The amount of acceptor added is not critical but should not be in such quantity as to interfere with the dehydrogenation reaction; from about 10 to 30 mole percent being sufficient.

The following examples serve to illustrate the process of this invention but do not limit it. Unless otherwise stated, all parts and percentages are by weight.

Example I

A complex of the formula IrCl(CO)(Ph$_3$P)$_2$, wherein Ph is phenyl, was prepared by adding 72 parts of triphenylphosphine, 10 parts of iridium chloride, 1000 parts of (β-methoxy-ethoxy) ethanol, and 200 parts of water to a reaction vessel. With stirring, the temperature was raised to 190° C. by distilling off the water, and the mixture maintained at this temperature for two hours. The catalyst complex was separated from the reaction mixture by cooling and a lemon-yellow crystalline compound was obtained in 64.6 percent yield.

Example II

To 17 parts of dodecane was added 3.9 parts of chlorocarbonylbis(triphenylphosphine) iridium (I) prepared in the manner of Example I. The entire system was flushed with carbon monoxide and then pressurized with carbon monoxide to 400 p.s.i.g. and heated for six hours at 375° C. The yield of C$_{12}$ olefin based on a paraffin conversion of 4.4 percent is 92.9 percent; the yield of cracked products was 7.1 percent, and no aromatics were formed.

An analogous result is obtained when the starting paraffin is hexane and the catalyst is IrBr(CO)(Ph$_3$P)$_2$ or IrCl(CO)(Ph$_3$P)$_2$ and the reaction temperature is 300° C. or 425° C.

Example III

To 3.9 parts of the catalyst prepared in the manner of Example I was added 8.5 parts of dodecane. The system was flushed with carbon monoxide and then vented. After heating to 375° C. for six hours, the yield of dodecene was 97.8 percent (based on paraffin conversion of about 4.7 percent).

Example IV

In this example, the paraffin, catalyst, temperature, and reaction time are the same as in Example III. However, to the reaction mixture was added 0.7 part of decene-1 and the system was pressured with nitrogen to 400 p.s.i.g. The dehydrogenation product was dodecene obtained in about 96.8 percent yield based on conversion of about 9.1 percent of the paraffin.

Analogous results are obtained when an iridium chlorocarbonylbis(triphenylarsine) or the analogous stibine compound is used.

Example V

To 9.6 parts of 1-methyl-1-cyclohexene was added 3.9 parts of IrCl(CO)(Ph$_3$P)$_2$ catalyst and reacted for six hours at 350° C. under a nitrogen pressure of 400 p.s.i.g. The yield of toluene was 30.8 percent based on a conversion of 66.3 percent of the 1-methyl-1-cyclohexene.

Example VI

Example IV was repeated except that 3.76 parts of 2-norbornene was used as the hydrogen acceptor instead of decene-1. The dehydrogenation product was dodecene in a yield of 88.5 percent based on paraffin conversion of 11.2 percent.

Example VII

Example IV was repeated except that the system was pressured with ethylene at 400 p.s.i.g. and the ethylene was also used as the hydrogen acceptor. The yield obtained for the dehydrogenated paraffin was 42.8 percent dodecene based on conversion of 23.6 percent of the dodecane.

Example VIII

Twenty-five parts of eicosane is contacted with 4 parts of osmium chlorodicarbonyltris(triphenylphosphine) catalyst at 375° C. for six hours under a carbon monoxide pressure of 400 p.s.i.g. The dehydrogenation products and yields are dodecene, 82 percent; cracking products, 12 percent; and aromatics, 6 percent, based on conversion of 12 percent of the paraffins.

Example IX

Example VIII is repeated except the catalyst used is iridium chlorocarbonylbis(ethyldiphenylphosphine). Analogous results are obtained.

Similarly, eicosane can be replaced with the following paraffins to form the corresponding olefins: n-hexane, 2-ethylhexane, n-dodecane, n-tetradecane, and n-hexadecane. The reaction temperature employed is 350–385° C. Similarly, commercial paraffin mixtures can be used. When using such mixtures, ethylene is employed as a hydrogen acceptor.

Similar results are obtained when the following catalysts are employed, one at a time:

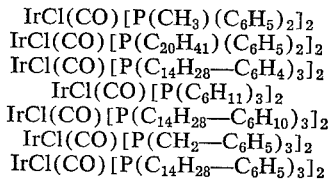

In the above formulas C$_6$H$_5$ is the phenyl radical, C$_{20}$H$_{41}$ is the eicosyl radical, C$_{14}$H$_{28}$C$_6$H$_4$ is the tetradecylphenyl group, C$_6$H$_{11}$ is cyclohexyl, C$_{14}$H$_{28}$—C$_6$H$_{10}$ is the tetradecylcyclohexyl radical, CH$_2$ — C$_6$H$_5$ is tolyl, and C$_{14}$H$_{28}$—C$_6$H$_5$ is phenyltetradecyl.

Similarly, the following catalysts can be used, one at a time, in the reactions of this example:

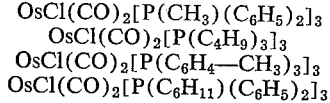

The products produced by the process of this invention are mixtures of monolefin isomers having the same number of carbon atoms as the paraffin starting material. Thus, when n-dodecane is used as the paraffin feed, the product obtained would be a mixture of dodecene isomers.

The olefins produced by the process of this invention are well-known compounds and have the many utilities which are known for them. For example, they are valuable chemical intermediates and can be transformed into acids by an ozonolysis reaction. Thus, for example, tetradecene can be reacted with ozone to yield lauric acid, a detergent range acid. Similarly, the other olefins produced by this process can be ozonized to yield the corresponding acids. When ozonizing the products of the process of this invention, the reaction is generally carried out at a low temperature; e.g., from −50 to about 10° C. After the ozonization reaction is completed, the resultant reaction mixture is usually treated with another oxidant such as air or oxygen to obtain the product acid. The secondary oxidation is usually carried out at a temperature within the range of 20 to 90° C. Solvents which can be employed in the ozonolysis of olefins include inert solvents such as chloroform and carbon tetrachloride or hydroxylic solvents such as methanol and acetic acid.

Having fully described the novel process, the catalysts used therein, and their mode of preparation, it is desired that this invention be limited only within the lawful scope of the appended claims.

I claim:
1. A process for dehydogenating paraffins having from 6 to about 20 carbon atoms comprising contacting said paraffins with a catalyst compound having the general formula:

$$MX(CO)_x(XR_3)_y$$

wherein M is selected from the group consisting of iridium and osmium, X is a halogen, $x$ and $y$ are integers, $x$ having a value of 1 or 2 and $y$ having a value of 2 or 3, such that the sum of $x$ and $y$ is equal to 3 when M is iridium, and equal to 5 when M is osmium, Y is selected from the group consisting of phosphorus, arsenic, and antimony, and R is selected from the group consisting of hydrogen, alkyl radicals having 1 to 20 carbon atoms, aryl radicals having from 6 to 20 carbon atoms, cycloalkyl radicals having 6 to 20 carbon atoms, and aralkyl radicals having 7 to 20 carbon atoms; said process being carried out at a temperature of from 300° to about 425° C.

2. The process of claim 1 wherein M is osmium, X is chlorine and Y is phosphorus.

3. The process of claim 1 wherein said catalyst is present at a concentration of from about 2.5 mole percent to about 10 mole percent.

4. The process of claim 1 wherein M is iridium, X is chlorine, and Y is phosphorus.

5. The process of claim 4 wherein said catalyst compound is iridium chlorocarbonylbis(triphenylphosphine).

6. The process of claim 5 wherein said process is carried out at a temperature of from 350° to about 385° C.

7. The process of claim 6 carried out in the presence of a hydrogen acceptor, said acceptor being a lower alkene hydrocarbon having from 2 to 19 carbon atoms such that said acceptor has at least one carbon atom less than said paraffin.

8. The process of claim 7 wherein said catalyst is present at a concentration of from 2.5 to 10 mole percent based upon said paraffin.

9. The process of claim 8 wherein said paraffin is n-dodecane and said acceptor is decene-1.

10. The process of claim 8 wherein said paraffin is n-dodecane and said acceptor is ethylene.

References Cited

Vaska & DiLuzio: J. Am. Chem. Soc., 83, 2784 (1961).

DELBERT E. GANTZ, Primary Examiner

G. E. SCHMITKONS, Assistant Examiner

U.S. Cl. X.R.

260—673.5

PO-1050
(5/69)

UNITED STATES PATENT OFFICE
CERTIFICATE OF CORRECTION

Patent No. 3,524,898          Dated August 18, 1970

Inventor(s) Patrick D. Beirne

It is certified that error appears in the above-identified patent and that said Letters Patent are hereby corrected as shown below:

Column 6, line 36, between "$C_{14}H_{28}$" and "$C_6H_4$" insert -- — --.
Column 7, line 6, (Claim 1), "$(XR_3)_y$" should read -- $(YR_3)_y$ --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents